United States Patent
Chae et al.

(10) Patent No.: US 10,568,000 B2
(45) Date of Patent: Feb. 18, 2020

(54) METHOD AND APPARATUS FOR INDICATING AN OFFLOADING DATA SIZE AND TIME DURATION IN A WIRELESS COMMUNICATION SYSTEM

(71) Applicant: LG ELECTRONICS INC., Seoul (KR)

(72) Inventors: Hyukjin Chae, Seoul (KR); Bonghoe Kim, Seoul (KR); Kaibin Huang, Hong Kong (CN); Changsheng You, Hong Kong (CN)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/060,764

(22) PCT Filed: Dec. 12, 2016

(86) PCT No.: PCT/KR2016/014531
§ 371 (c)(1),
(2) Date: Jun. 8, 2018

(87) PCT Pub. No.: WO2017/099548
PCT Pub. Date: Jun. 15, 2017

(65) Prior Publication Data
US 2019/0014499 A1    Jan. 10, 2019

Related U.S. Application Data

(60) Provisional application No. 62/265,996, filed on Dec. 11, 2015.

(51) Int. Cl.
*H04W 28/08* (2009.01)
*H04L 12/803* (2013.01)

(52) U.S. Cl.
CPC ........... *H04W 28/08* (2013.01); *H04L 47/125* (2013.01)

(58) Field of Classification Search
CPC ..... H04W 28/08; H04L 41/0823; H04L 43/16
See application file for complete search history.

(56) References Cited

U.S. PATENT DOCUMENTS

2011/0320520 A1* 12/2011 Jain ..................... G06F 9/5072
  709/203
2014/0032405 A1   1/2014 Kurabayashi et al.

OTHER PUBLICATIONS

Oueis, "Multi-parameter Decision Algorithm for Mobile Computation Offloading", 2014 IEEE Wireless Communications and Networking Conference (WCNC), Apr. 2014 (Year: 2014).*

(Continued)

*Primary Examiner* — Siming Liu
(74) *Attorney, Agent, or Firm* — Dentons US LLP

(57) ABSTRACT

The object of the present invention can be achieved by providing a method of indicating an offloading data size and time duration to a user equipment (UE) in a wireless communication system, the method comprising: receiving, by a Base station (BS) from a plurality of UEs, an input computing data size and local computing power; determining, by the BS, whether an each priority of the plurality of the UEs is greater than a threshold by using an offloading priority; determining, by the BS, an offloading data size and a time duration for each of UEs; transmitting, by the BS to the each of UEs, the determined offloading data size and a time duration for the each of UEs.

13 Claims, 10 Drawing Sheets

(56) References Cited

OTHER PUBLICATIONS

Zhao, "Energy-Efficient Task Offloading for Multiuser Mobile Cloud Computing", 2015 IEEE/CIC International Conference on Communications in China (ICCC), Nov. 2015 (Year: 2015).*

Yanchen Liu et al., "An Adaptive Resource Allocation Algorithm for Partitioned Services in Mobile Cloud Computing," 2015 IEEE Symposium on Service-Oriented System Engineering (SOSE), pp. 209-215, Jun. 25, 2015.

Rajkumari Roopali, "Overview of Offloading in Smart Mobile Devices for Mobile Cloud Computing," International Journal of Computer Service and Information Technologies, vol. 5 (6), 2014, pp. 7855-7860, Nov. 6, 2014.

Manjinder Nir et al., "An energy optimizing scheduler for mobile cloud computing environments," 2014 IEEE Conference on Computer Communications Workshops (INFOOOM WKSHPS), pp. 404-409, Jul. 8, 2014.

Zhefeng Jiang et al., "Energy Delay Tradeoff in Cloud Offloading for Multi-Core Mobile Devices," IEEE Access, vol. 3, pp. 2306-2316, Nov. 10, 2015.

* cited by examiner

FIG. 9
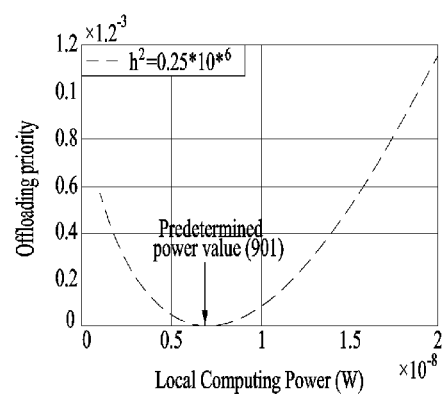
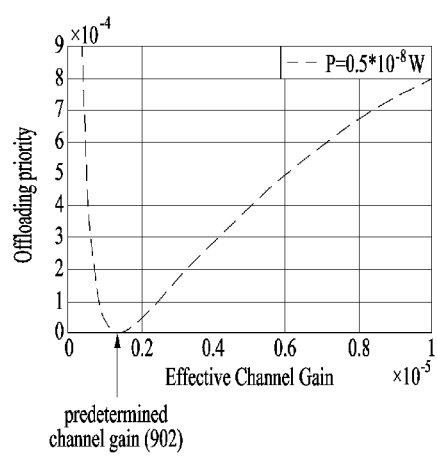

METHOD AND APPARATUS FOR INDICATING AN OFFLOADING DATA SIZE AND TIME DURATION IN A WIRELESS COMMUNICATION SYSTEM

This application is a National Stage Application of International Application No. PCT/KR2016/014531, filed on Dec. 12, 2016, which claims the benefit of U.S. Provisional Application No. 62/265,996, filed on Dec. 11, 2015, all of which are hereby incorporated by reference in their entirety for all purposes as if fully set forth herein.

TECHNICAL FIELD

The present invention relates to a wireless communication system, and more particularly, to a method and apparatus for indicating an offloading data size and time duration.

BACKGROUND ART

Last decade has witnessed the thriving development of mobile communication industry, not limited to the proliferation of mobiles, but also the various computing-intensive mobile applications. The question of how to address the tremendous computation has incurred the promising technology of Mobile Cloud Computing (MCC) <9>, which, alternatively, offloads the computation from the energy-hungry mobiles to a powerful cloud.

The essence of MCC, shifting the energy consumption from the local computing to offloading, leads to the joint design of wireless communication and mobile computing techniques, to enhance the computation capacity and prolong the lives of mobiles. For local computing, energy-efficient mobile control have been developed for a long time, such as the multiple task scheduling <8>, dynamic voltage scaling <4> and power management<2>. For offloading, diversified mechanisms have been investigated intensively [1, 6, 7, 11, 12]. For a single-task application, the offloading decision was obtained in <12> after optimizing the control methods of local computing and offloading. In <11>, one collaborate task execution was proposed to minimize the energy consumption of multiple-task applications. Furthermore, <6> derived the optimal application partitioning to achieve the maximum throughput of data stream. Nevertheless, all of above work focused on the single-mobile offloading and the extensions of them to the multiple-mobiles scenario are unknown. Afterwards, more attention was paid to the multiuser mobile cloud computing diagram. In <1>, the transmission power and CPU cycles were controlled for minimizing the power consumption of mobiles. However, the scheduling delay has not been considered, which refers to the waiting time due to the highly-loaded cloud and affected by the aggregated amount of offloaded data in the cloud. In another work <7>, the scheduling delay was concerned for minimizing the average completion time for multiuser computation partitioning, however, that lacks the consideration for energy consumption. The current work optimizes the offloading policy in the multiuser MCC system for the minimum energy consumption, accounting for the individual delay constraint.

In this paper, we make attempt to characterize the offloading policy in the multiuser MCC system. The contributions of this paper are summarized as follows. First, assuming the deployment of TDMA, for each mobile, both the offloaded data size and offloading time duration should to optimized for the minimum weighted energy consumption under the individual delay constraint. The formulated convex problem is solved by the proposed two-stage method that is of low complexity and useful insights. Second, for the strong cloud with huge computation capacity, instead of iteratively solving KKT (Karush Kuhn Tucker) conditions, the optimal offloading policy is shown to be priority-and-threshold based where mobiles with high offloading priority tend to perform full offloading. Moreover, special cases with respect to (with respect to) channel gain and local computing power are analyzed and the greedy approaches are shown to be optimal. Last, the low-complexity suboptimal method for the critical cloud is proposed and verified to be close-to-optimal by simulations.

DISCLOSURE

Technical Problem

The technical task of the present invention is to provide offloading data size and time duration.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

The object of the present invention can be achieved by providing a method of indicating an offloading data size and time duration to a user equipment (UE) in a wireless communication system, the method comprising: receiving, by a Base station (BS) from a plurality of UEs, an input computing data size and local computing power; determining, by the BS, whether an each priority of the plurality of the UEs is greater than a threshold by using an offloading priority; determining, by the BS, an offloading data size and a time duration for each of UEs; transmitting, by the BS to the each of UEs, the determined offloading data size and a time duration for the each of UEs.

In another aspect of the present invention, provided herein is a Base station (BS) indicating an offloading data size and time duration to a user equipment (UE) in a wireless communication system, comprising: a receiving device; a transmitting device; and a processor, wherein the processor is configured to receives, from a plurality of UEs, an input computing data size and local computing power, determine whether an each priority of the plurality of the UEs is greater than a threshold by using an offloading priority, determine an offloading data size and a time duration for each of UEs, and transmit by the BS to the each of UEs, the determined offloading data size and a time duration for the each of UEs.

If offloading priority of a first UE is greater than the threshold, an offloading data size of the first UE corresponds to an input computing data size of the first UE, wherein if offloading priority of a second UE is equal to the threshold, an offloading data size of the second UE is bigger than a delay constraint data size and is smaller than an input computing data size of the second UE, and wherein if offloading priority of a third UE is smaller than the threshold, an offloading data size of the third UE corresponds to the delay constraint data size.

The offloading priority corresponds to $\varphi(P_k, h_k)$ satisfying $$\varphi(P_k, h_k) = BP_k \log_2\left(\frac{BP_k h_k^2}{N_0 \ln 2}\right) + \frac{N_0}{h_k^2} - \frac{BP_k}{\ln 2},$$

$P_k$ is local computing power for each cycle, $h_k$ is channel gain magnitude, B is bandwidth, $N_0$ is noise power, k indicates k-th UE of the plurality of the UEs.

A minimum weighted total energy consumption is determined from information including the input computing data size, the local computing power and a channel gain of the plurality of UEs, The offloading data size $\lambda_k$ and a time duration $t_k$ are optimized result for the minimum weighted total energy consumption The minimum weighted total energy consumption corresponds to $$\min_{\{\lambda_k, t_k\}} \sum_{k=1}^{K} \beta_k \left[ \frac{t_k}{h_k^2} f\left(\frac{\lambda_k}{t_k}\right) + (R_k - \lambda_k) C_k P_k \right]$$

$$\text{s.t.} \quad \sum_{k=1}^{K} t_k \leq T_0, \sum_{k=1}^{K} C_k \lambda_k \leq F_0,$$

$$t_k \geq 0, m_k^+ \leq \lambda_k \leq R_k, k = 1, 2, \Lambda, K.,$$

wherein function $(x)^+=\max\{x,0\}$, $\beta_k$ is the weighting factor, $t_k$ is the offloading time duration, $\lambda_k$ is offloading data size, $R_k$ is the input computing data size, $C_k$ is the number of CPU cycles, $F_0$ is maximum cloud computation capacity, $T_0$ is a time-sharing constraint, $m_k$ is a delay constraint data size.

The offloading data size and the time duration determination step is performed when a cloud computation capacity constraint is satisfied.

The method further comprising, receiving the offloading data from each of UEs having priority that is greater than and equal to the threshold, transmitting the received offloading data to a cloud server, receiving a processed result based on the offloading data from the cloud serve. transmitting the processed result to the each of UEs.

Advantageous Effects

According to the present invention, total energy consumption and delay are improved for simple data offloading.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 9 depicts a characteristic of the offloading priority.

BEST MODE

Figure 1:
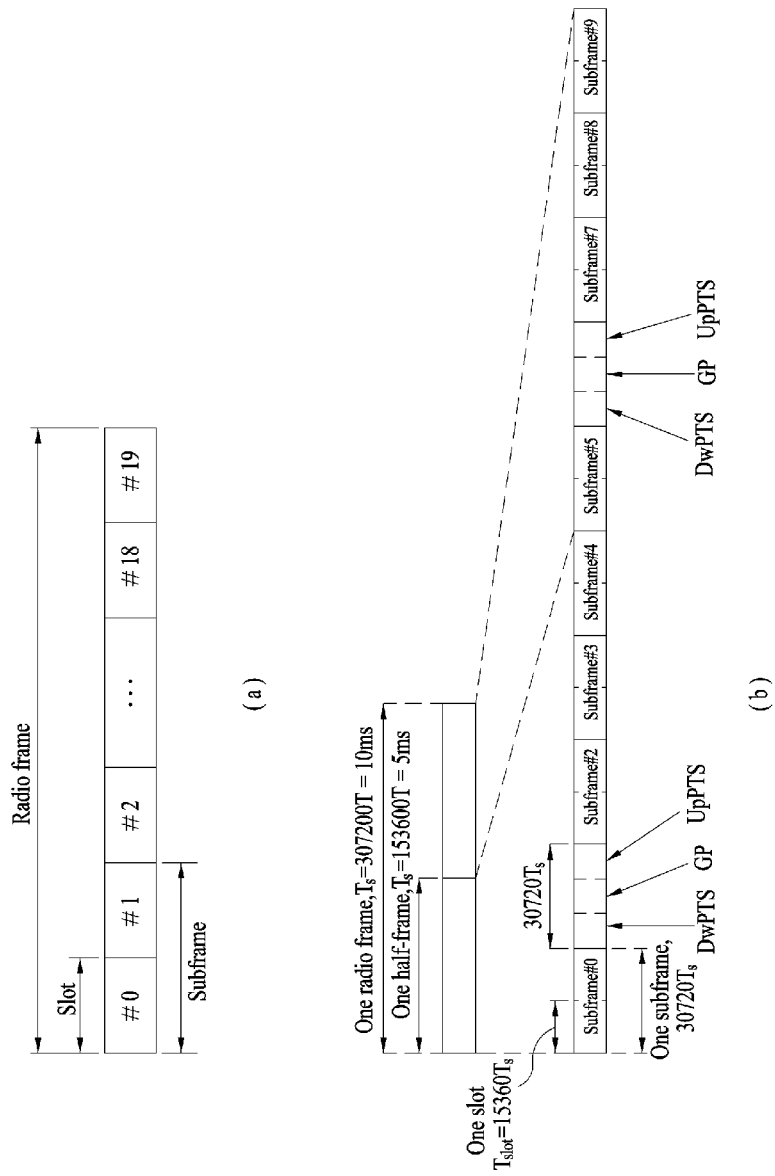
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station,' "Node-B,' "eNode-B (eNB),' and "access point'. The term "relay" may be replaced with such terms as "relay node (RN)' and "relay station (RS)'. The term "terminal" may also be replaced with such terms as "user equipment (UE),' "a mobile station (MS),' "mobile subscriber station (MSS)' and "subscriber station (SS)'.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
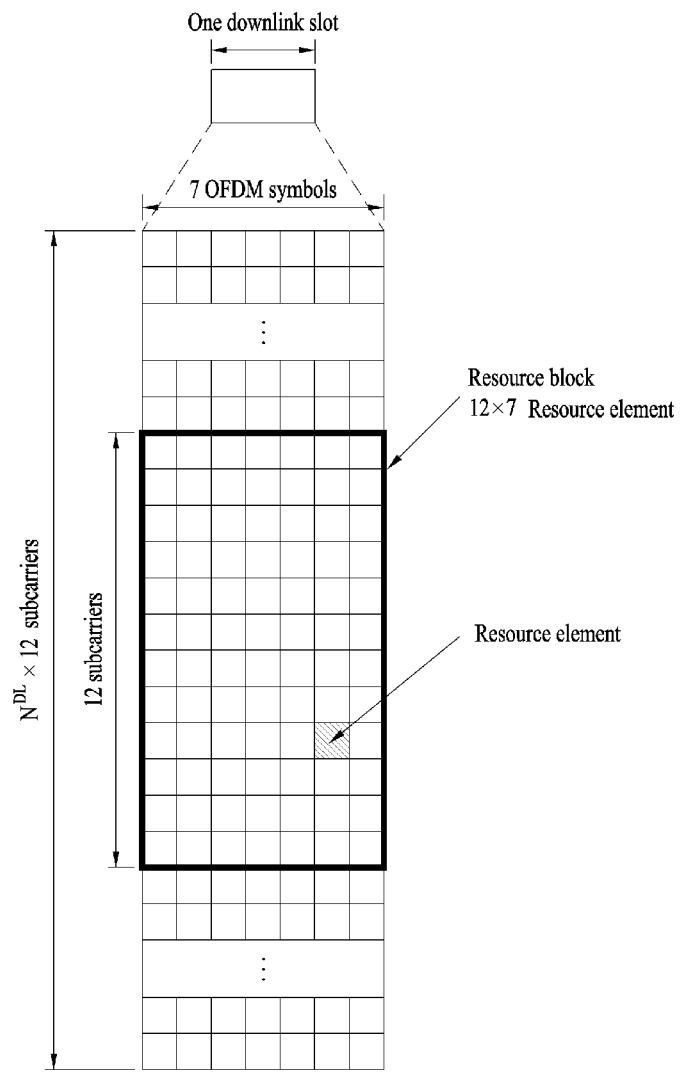
FIG. 2 illustrates a structure of a downlink resource grid for the duration of one downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12 7 REs. The number NDL of RBs included in a downlink slot depends on a DL transmission bandwidth. A UL slot may have the same structure as a DL slot.

Figure 3:
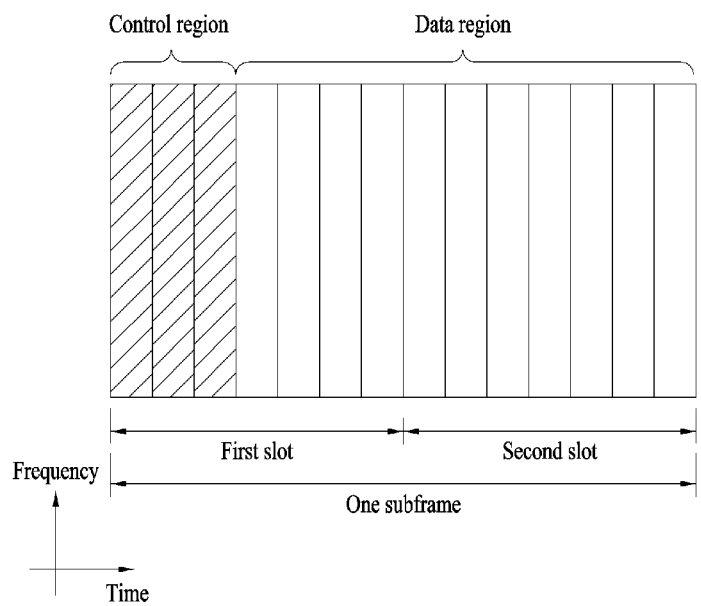
FIG. 3 illustrates a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
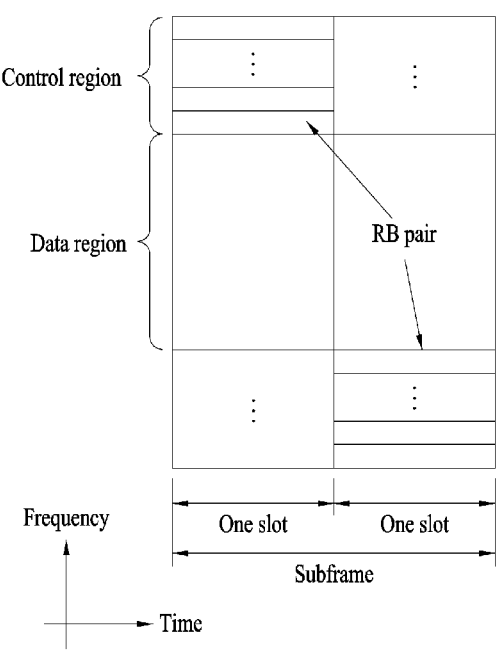
FIG. 4 illustrates a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Figure 5:
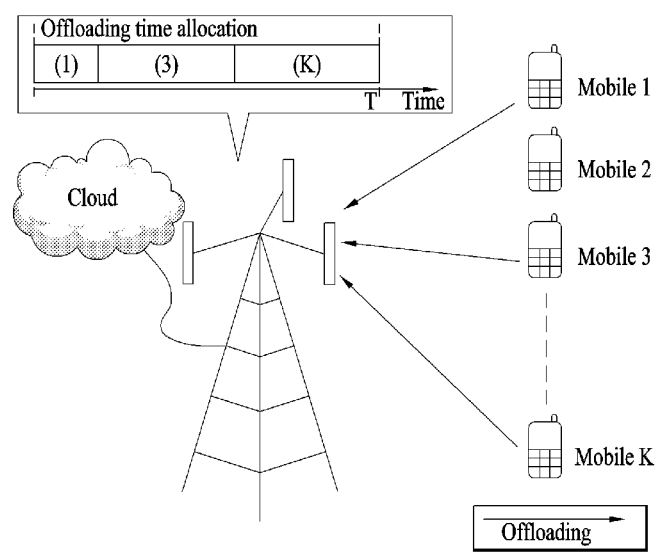
FIG. 5 illustrates relay of a synchronization signal.

FIG. 5 illustrates multiuser mobile cloud computing system that can be applicable to present invention. The multiuser mobile cloud computing system comprises K single-antenna mobiles and one multi-antenna BS that is the mediate of cloud. To account for the individual delay, it is assumed that given a fixed time frame, denoted as T, delay-sensitive UEs are required to process larger amount of computing data, compared with the delay-tolerant ones. There are two operation modes for each UE: local computing and offloading. The BS selects multiple UEs for computation offloading and the offloaded data is processed in the cloud. The offloaded data size and time duration for each UEs are optimized in the sequel for reducing the total energy consumption in this multiuser system. Assume that the time-division multiple access (TDMA) is adopted in the system where selected UEs can offload certain amount of data to the BS in the allocated time duration with full bandwidth. Specifically, for the k-th UE, let $R_k$ denote the input data size/input computing data size (bit) that can be divided into two parts for separate offloading and local computing, represented as $\lambda_k$ and $R_k-\lambda_k$, respectively.

Figure 6:
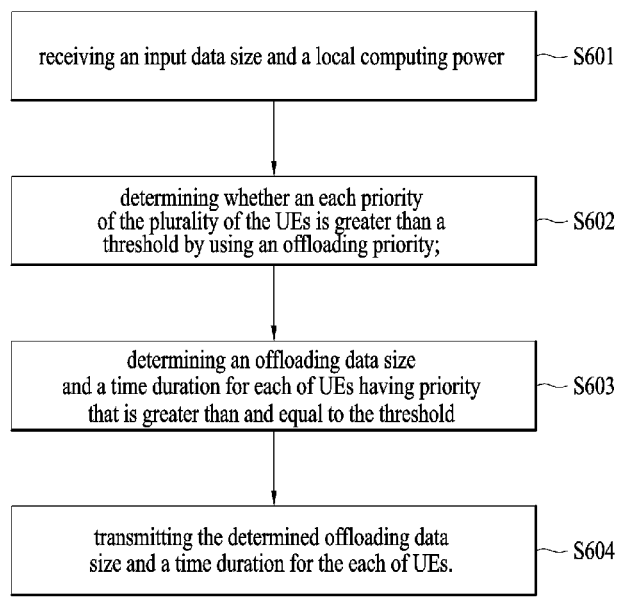
FIG. 6-8 is a diagram for method of indicating an offloading data size and time duration.

FIG. 6 is a diagram for method of indicating an offloading data size and time duration according to one embodiment of present invention.

Referring to FIG. 6, the BS receives an input computing data size, $R_k$, and local computing power, $P_k$, from a plurality of UEs. The BS can further receives a channel gain, $h_k$, the number of CPU cycles (computation capacity), $C_k$, and weighting factor, $\beta_k$, of the plurality of UEs (S601). The BS can determines whether an each priority of the plurality of the UEs is greater than a threshold by using an offloading priority (S602). The offloading priority corresponds to $\varphi(P_k, h_k)$ satisfying $$\varphi(P_k, h_k) = BP_k \log_2\left(\frac{BP_k h_k^2}{N_0 \ln 2}\right) + \frac{N_0}{h_k^2} - \frac{BP_k}{\ln 2},$$

$P_k$ is local computing power for each cycle, $h_k$ is channel gain magnitude, B is bandwidth, $N_0$ is noise power, k indicates k-th UE of the plurality of the UEs. The BS determines an offloading data size, $\lambda_k$, and a time duration, $t_k$, for each of UEs (S603). The specific criteria for determining the offloading data size and the time duration are as follows. If offloading priority of a first UE is greater than the threshold, an offloading data size of the first UE corresponds to an input computing data size of the first UE. If offloading priority of a second UE is equal to the threshold, an offloading data size of the second UE is bigger than a delay constraint data size and is smaller than an input computing data size of the second UE. If offloading priority of a third UE is smaller than the threshold, an offloading data size of the third UE corresponds to the delay constraint data size.

The BS transmits the determined the offloading data size and a time duration for the each of UEs to the each of UEs (S604). After transmitting the offloading data size and a time duration, the BS receives feedback from each of UEs having priority that is greater than and equal to the threshold. The BS can transmit the received offloading data to a cloud server and receives a processed result based on the offloading data from the cloud serve. The BS can transmit the processed result to the each of UEs.

Figure 7:
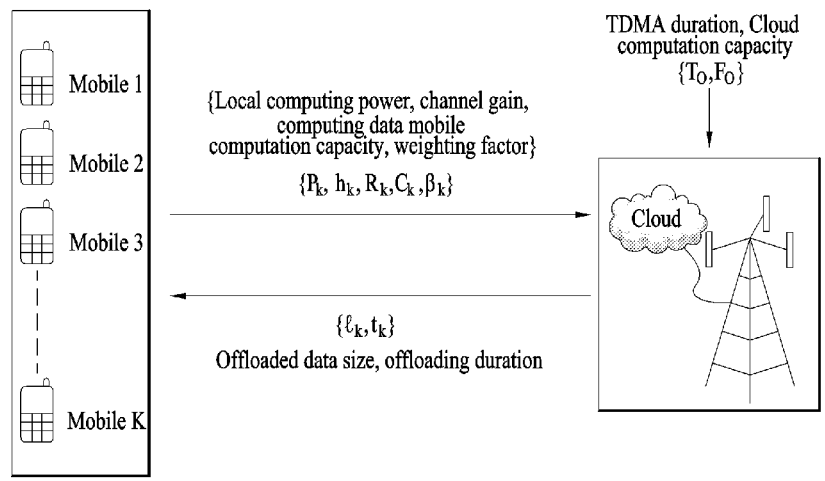

The FIG. 7 illustrates the above explained method briefly. Based on FIG. 7, the UEs send their computing information to the BS including the local computing power, channel gain, computing data, UE computation capacity and weighting factor. Considering the TDMA duration and cloud computation capacity, the BS optimizes the resource allocation and feedback the results to the UEs including the offloaded data size and offloading duration.

Figure 8:
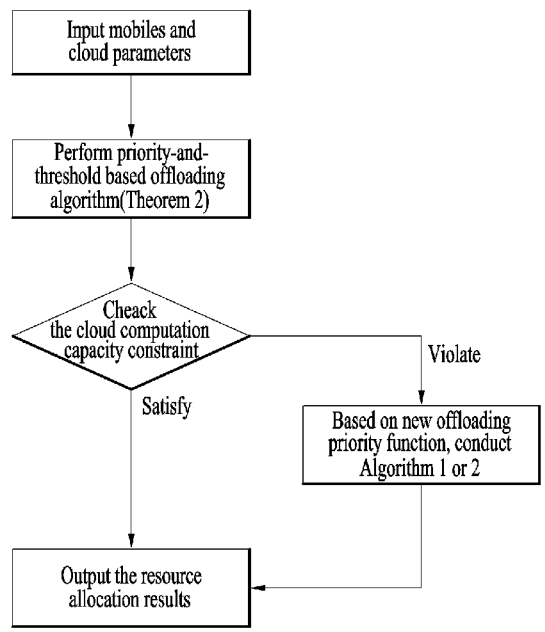

Here, the offloading data size and the time duration determination step can be performed when a cloud computation capacity constraint is satisfied, as depicted in FIG. 8. That is, the aggregated offloaded computation should not exceed the defined maximum cloud computation capacity, denoted as $F_0$.

The minimum weighted total energy consumption is determined from information including the input computing data size, the local computing power and a channel gain of the plurality of UEs and the offloading data size and the time duration are optimized result for the minimum weighted total energy consumption. The minimum weighted total energy consumption corresponds to $$\min_{\{\lambda_k, t_k\}} \sum_{k=1}^{K} \beta_k \left[ \frac{t_k}{h_k^2} f\left(\frac{\lambda_k}{t_k}\right) + (R_k - \lambda_k) C_k P_k \right]$$

$$\text{s.t.} \quad \sum_{k=1}^{K} t_k \leq T_0, \sum_{k=1}^{K} C_k \lambda_k \leq F_0,$$

$$t_k \geq 0, m_k^+ \leq \lambda_k \leq R_k, k = 1, 2, \Lambda, K.,$$

wherein function $(x)^+=\max\{x,0\}$, $\beta_k$ is the weighting factor, $t_k$ is the offloading time duration, $\lambda_k$ is offloading data size, $R_k$ is the input computing data size, $C_k$ is the number of CPU cycles, $F_0$ is maximum cloud computation capacity, $T_0$ is a time-sharing constraint, $m_k$ is a delay constraint data size. The minimum weighted total energy consumption is based on an energy consumption for local computing and an energy consumption for offloading.

For local computing, following the model in <3>, define $C_k$ as the number of CPU cycles required for computing 1-bit of data for the k-th UE and $P_k$ as its local computing power for each cycle. Then the energy consumption for local computing, denoted as $E_{loc,k}$, is given by $E_{loc,k}=(R_k-\lambda_k)C_k P_k$. Let $F_k$ where k=1, 2, $\Lambda$ K denote the computation capacity of each UE (i.e., CPU cycles per time unit). Then the delay constraint that sets the limitation to the maximum local computing data size is readily given as $C_k(R_k-\lambda_k) \leq F_k T$. It follows that the offloaded data size should satisfy $\lambda_k \geq m_k$, where $$m_k = R_k - \frac{F_k T}{C_k}.$$

Hereinafter, the $m_k$ is called as delay constraint data size.

For offloading, the UE offloads the computation to the cloud by transmitting the data to the BS. Define $p_k$ and $h_k$ as the transmission power and channel gain magnitude. Then the achievable rate, denoted by $r_k$, is given as $$r_k = B \log\left(1 + \frac{p_k h_k^2}{N_0}\right),$$

where B is the bandwidth and $N_0$ is the noise power. Let $t_k$ represent the allocated offloading time duration. Moreover, fixed transmission rate $r_k = \lambda_k/t_k$ is assumed since it is the most energy-efficient transmission policy under a deadline constraint as proved in <5>. Define $$f(x) = N_0\left(2^{\frac{x}{B}} - 1\right).$$

It follows from (3) that the energy consumption for offloading is $$E_{off,k} = p_k t_k = \frac{t_k}{h_k^2} f\left(\frac{\lambda_k}{t_k}\right).$$

Note that if $\lambda_k=0$, it has $t_k=0$ and $E_{off,k}$ is defined as 0. Similar to <1>, to guarantee the quality of computing in the cloud (e.g., short computing delay), it is assumed that the aggregated offloaded computation should not exceed the defined maximum cloud computation capacity, denoted as $F_0$. It is formulated as $$\sum_{k=1}^{K} C_k \lambda_k \leq F_0.$$

As mentioned above, the total energy consumption in the multiuser system is given as, $$\sum_{k=1}^{K} \beta_k (E_{off,k} + E_{loc,k}),$$

where $\beta_k > 0$ is the weighting factor accounting for the fairness. Moreover, the limited time duration of the TDMA system leads to the time-sharing constraint: $\Sigma_{k=1}^{K} t_k \leq T$. Based on the above discussion, the optimization problem for the minimum total weighted energy consumption is readily formulated as following problem 1.

$$\min_{\{\lambda_k, t_k\}} \sum_{k=1}^{K} \beta_k \left[\frac{t_k}{h_k^2} f\left(\frac{\lambda_k}{t_k}\right) + (R_k - \lambda_k) C_k P_k\right] \quad \text{[Problem 1]}$$

$$\text{s.t.} \sum_{k=1}^{K} t_k \leq T_0, \sum_{k=1}^{K} C_k \lambda_k \leq F_0,$$

$$t_k \geq 0, m_k^+ \leq \lambda_k \leq R_k, k = 1, 2, \Lambda, K.$$

where the function $(x)^+ = \max\{x, 0\}$.

The offloaded data size and time duration for each UE are optimized for the minimum weighted total energy consumption. The formulated convex problem is solved by a two-stage method. More importantly, the offloading priority function is derived to characterize the offloading policy structure where the radio and computing resource are allocated to UEs in the descending order of offloading priority. Furthermore, special cases with respect to channel gain and local computing power are analyzed and show the greedy approach is optimal.

Observe that $\lambda_k$ and $t_k$ are coupled in the objective function of Problem P1, however, that can be proved to be a convex optimization problem in the lemma 1 that 'Problem P1 is a convex problem'. The optimal solution of Problem P1 may not be unique. For example, when $R_k=R_0$, $h_k=h_0$, $C_k=c_0$, $f_k=f_0$ and $P_k=P_0$ for all k, all the UEs have the same condition for offloading, leading to the non-unique solution. To characterize the structure of optimal offloading policy, we assume the solution for Problem P1 is unique at first. The feasibility condition is given in the following lemma 2 that 'The feasibility condition for Problem P1 is $\Sigma k_{=1}^K m_k^+ C_k \leq F_0$'.

For the feasible Problem P1, the optimal solution can be derived from KKT conditions, however, that is without closed form and needs iterative computation. In the following, alternatively, Problem P1 is solved by a two-stage method where low-complexity and optimal offloading policies are derived with useful insights.

First, define two problems P2 and P3 that correspond to the cases of strong and critical cloud, respectively, as following problem 2 (P2) and problem 3 (P3).

$$\min_{\{\lambda_k, t_k\}} \sum_{k=1}^{K} \beta_k \left[\frac{t_k}{h_k^2} f\left(\frac{\lambda_k}{t_k}\right) + (R_k - \lambda_k) C_k P_k\right] \quad \text{[Problem 2]}$$

$$\text{s.t.} \sum_{k=1}^{K} t_k \leq T_0,$$

$$t_k \geq 0, m_k^+ \leq \lambda_k \leq R_k, k = 1, 2, \Lambda, K.$$

$$\min_{\{\lambda_k, t_k\}} \sum_{k=1}^{K} \beta_k \left[\frac{t_k}{h_k^2} f\left(\frac{\lambda_k}{t_k}\right) + (R_k - \lambda_k) C_k P_k\right] \quad \text{[Problem 3]}$$

$$\text{s.t.} \sum_{k=1}^{K} t_k \leq T_0, \sum_{k=1}^{K} C_k \lambda_k = F_0,$$

$$t_k \geq 0, m_k^+ \leq \lambda_k \leq R_k, k = 1, 2, \Lambda, K.$$

The optimal solutions for Problem P2 and P3 are denoted as $\{\lambda_k^{*(2)}, t_k^{*(2)}\}$ and $\{\lambda_k^{*(3)}, t_k^{*(3)}\}$, respectively. Then the two-stage method for deriving the optimal solution for Problem P1, denoted as $\{\lambda_k^*, t_k^*\}$, is described in Theorem 1 in following table 1.

TABLE 1

Problem P1 can be solved by the following two-stage method.

1. Solve Problem P2.
2. If $\Sigma_{k=1}^{K} C_k \lambda_k < F_0$, then $\{\lambda_k^*, t_k^*\} = \{\lambda_k^{*(2)}, t_k^{*(2)}\}$.
   Otherwise, solve Problem P3 and $\{\lambda_k^*, t_k^*\} = \{\lambda_k^{*(3)}, t_k^{*(3)}\}$.

In the following, the offloading priority function is firstly derived for characterizing the optimal offloading policy for Problem P2 with several useful insight. Then Problem P3 is optimally solved by the similar method and provided with a suboptimal but low-complexity solution.

For Problem P2, define the following partial Lagrange function, $$L = \sum_{k=1}^{K} \beta_k \left[ \frac{t_k}{h_k^2} f\left(\frac{\lambda_k}{t_k}\right) + (R_k - \lambda_k) C_k P_k \right] + \lambda \left( \sum_{k=1}^{K} t_k - T_0 \right),$$

where $\lambda$ is the Lagrange multiplier with respect to the time-sharing constraint. Define a function $g(x) = f(x) - x f'(x)$, then applying KKT conditions leads to the following necessary and sufficient conditions, $$\frac{\partial L}{\partial \lambda_k} = \frac{\beta_k f'\left(\frac{\lambda_k^{*(2)}}{t_k^{*(2)}}\right)}{h_k^2} -$$

$$\beta_k C_k P_k \{ > 0, \lambda_k^{*(2)} = m_2^+ = 0, \lambda_k^{*(2)} \in (m_k^+, R_k) < 0, \lambda_k^{*(2)} = R_k, \forall k.$$

$$\frac{\partial L}{\partial \lambda_k} = \frac{\beta_k f'\left(\frac{\lambda_k^{*(2)}}{t_k^{*(2)}}\right)}{h_k^2} + \lambda \{ > 0, t_k^{*(2)} = 0 = 0, t_k^{*(2)} > 0, \forall k.$$

$$\sum_{k=1}^{K} t_k^{*(2)} \leq T_0, \lambda \left( \sum_{k=1}^{K} t_k^{*(2)} - T_0 \right) = 0.$$

Denote $h^{-1}(x)$ as the inverse function of one general function $h(x)$. To look into the optimal policy structure of Problem P2, define $\varphi(\beta_k, C_k, P_k, h_k)$ as the offloading priority for each UE, given as, $$\varphi(\beta_k, C_k, P_k, h_k) = \beta_k \left[ BC_k P_k \log_2\left(\frac{BC_k P_k h_k^2}{N_0 \ln 2}\right) + \frac{N_0}{h_k^2} - \frac{BC_k P_k}{\ln 2} \right],$$

which is the root of the following equation $$\varphi(P_k, h_k) = BP_k \log_2\left(\frac{BP_k h_k^2}{N_0 \ln 2}\right) + \frac{N_0}{h_k^2} - \frac{BP_k}{\ln 2}.$$

The offloading priority for each UE can be written with two important factor, channel gain $h_k$ and local computing power $P_k$, as $$f'^{-1}(C_k P_k h_k^2) = g^{-1}\left(\frac{-h_k^2 x}{\beta_x}\right)..$$

FIG. 9 depicts a relation between the offloading priority and the local computing power and a relation between the offloading priority and channel gain. Referring FIG. 9, a certain threshold, larger channel gain and/or larger local computing power corresponds to higher offloading priority. We can say the the offloading priority is proportional to a difference between the local computing power and a predetermined power value (901) and is proportional to a difference between the channel gain and a predetermined channel gain (902).

The activeness of the time-sharing constraint and optimal solution for Problem P2 are given as Theorem 2 in following table 2.

TABLE 2

1. If $C_k P_k h_k^2 \leq \frac{N_0 \ln 2}{B}$ and $m_k^+ = 0$ for all k, the time sharing constraint is innactive and
$\lambda_k^{*(2)} = t_k^{*(2)} = 0 \; \forall k.$ 2. If their exits one k such that $C_k P_k h_k^2 > \frac{N_0 \ln 2}{B}$ or $m_k^+ > 0$, the time sharing constraint is active, i.e., $\sum_{k=1}^{K} t_k^{*(2)} = T_0$; for each UE, $$\lambda_k^{*(2)} \begin{cases} = m_k^+ & \varphi(\beta_k, C_k, P_k, h_k) < \lambda, \\ \in [m_k^+, R_k] & \varphi(\beta_k, C_k, P_k, h_k) = \lambda, \\ = R_k, & \varphi(\beta_k, C_k, P_k, h_k) > \lambda \end{cases}$$

and $$t_k^{*(2)} = \frac{\lambda_k^{*(2)} \ln 2}{B \left[ W\left(\frac{\lambda h_k^2/\beta_k - N_0}{N_0 e}\right) + 1 \right]}$$

where $W(x)$ is the Lambert function and $\lambda$ satisfies the time-sharing constraint.

Unlike the traditional multiuser TDMA system where the time-sharing constraint always actives for the minimum total transmission energy <10>, in the multiuser mobile cloud computing system, the offloading duration will be fully utilized only when there exist some 'critical" mobiles that need computation offloading due to individual delay or certain UEs have high enough $C_k P_k h_k^2$, indicating that the data transmission will cause small amount of energy or the local computing is quite consuming. Apart from the offloading priority that is affected by the weighting factor, local computing power and channel gain, the individual delay also influences the optimal offloading policy. All UEs must offload at least $m_k^+$ computing data due to the delay constraint, even for the UEs with low offloading priority. More importantly, given the distribution of channel gain, it has probability one (w.p.1) that all the UEs has binary choice: UEs with high offloading priority tend to perform full offloading; the ones with low priorities will offload the minimum data. It can be proved that the extending of time-sharing duration will result in the decrease of $\lambda$, such that more UEs will access to this multiuser TDMA system and the offloading rate will increase. Traditional method for solving Problem P2 is the block-coordinate descending which iteratively optimizes between $\{\lambda_k\}$ and $\{t_k\}$ with one set of them fixed at one time. In contrast, the proposed method performs one-dimension search with respect to $\lambda$, reducing the computation complexity significantly.

If all UEs have the same offloading priority, with the properties stated in the following lemma and Theorem 2, it can easily characterized the optimal offloading policy for following 3 cases without the comparison of offloading priority.

Case 1: symmetric multiuser.

Since all the UEs have the same offloading priority, each UE can perform offloading satisfying $$\lambda_k^{*(2)} = t_k^{*(2)} B \log_2\left(\frac{BCPh^2}{N_0 \ln 2}\right) \geq m_k^+$$

and the aggregated offloaded data is $$\sum_{k=1}^{K} \lambda_k^{*(2)} = T_0 B \log_2\left(\frac{BCPh^2}{N_0 \ln 2}\right).$$

Case 2: Multiple UEs have distinct local computing power.

Let $\pi^*$ be the permutation notation. Re-arrange $\{P_k\}$ in the descending order and re-denote it as $P_{\pi^*(k)}$ such that $P_{\pi^*(1)} > P_{\pi^*(2)} \Lambda > P_{\pi^*(K)}$. Denote the new offloading priority as $\{\varphi(P_{\pi^*(n)})\}$ for notation simplicity. The optimal offloading policy is given the following Corollary in table 3.

TABLE 3

Given $P_{\pi^*(1)} > P_{\pi^*(2)} \Lambda > P_{\pi^*(K)}$, the optimal offloading policy for Problem P2, denoted as $\{\lambda_{\pi^*(k)}^{*(2)}, t_{\pi^*(k)}^{*(2)}\}$, is:

1. if $\varphi(P_{\pi^*(n)}) > \lambda > \varphi(P_{\pi^*(n+1)})$ $$\lambda_{\pi^*(k)}^{*(2)} = \begin{cases} R_{\pi^*(k)} & \pi^*(k) = 1, \Lambda\ n, \\ m_{\pi^*(k)}^+, & \text{otherwise} \end{cases}$$

2. if $\varphi(P_{\pi^*(n)}) = \lambda > \varphi(P_{\pi^*(n+1)})$ $$\lambda_{\pi^*(k)}^{*(2)} \begin{cases} = R_{\pi^*(k)} & \pi^*(k) = 1, \Lambda\ n - 1, \\ \in [m_{\pi^*(k)}^+, R_{\pi^*(k)}] & \pi^*(k) = n, \\ = m_{\pi^*(k)}^+, & \text{otherwise} \end{cases}$$

and $$t_{\pi^*(k)}^{*(2)} = \frac{\lambda_{\pi^*(k)}^{*(2)} \ln 2}{B\left[W\left(\frac{\lambda h^2/\beta - N_0}{N_0 e}\right) + 1\right]}$$

where $\lambda$ satisfies the time-sharing constraint.

The above optimal offloading policy is shown as a greedy approach, where UEs with larger local computing power offload data first until the time-sharing duration is fully utilized.

Case 3: Multiple UEs have distinct channel gain.

Using lemma 3, 'when $$CPh^2 \geq \frac{N_0 \ln 2}{B},$$

$\varphi(\beta, c, P, h)$ is monotone increasing with respect to $\beta$, c, P and h, respectively', the offloading policy can be derived by the similar method for the Corollary 1. The greedy approach that prefers offloading computation from the UEs with higher local computing power, can be shown to be optimal.

For Optimal Offloading Policy in the Critical Cloud, considering the maximum cloud computation capacity constraint in this sub-section, we show that by defining the effective local computing power, the priority based offloading policy is still optimal. Moreover, one suboptimal but low-complexity method is provided.

The Lagrange function for Problem P3 is as follows.

[Problem 3]

$$\bar{L} = \sum_{k=1}^{K} \beta_k \left[\frac{t_k}{h_k^2} f\left(\frac{\lambda_k}{t_k}\right) + (R_k - \lambda_k) C_k P_k\right] +$$

$$\lambda\left(\sum_{k=1}^{K} t_k - T_0\right) + \mu\left[\sum_{k=1}^{K} C_k \lambda_k - F_0\right]$$

It is worthy to point out that the KKT conditions for Problem P3 can be obtained from that of Problem P2 where $P_k$ is rewritten as the effective local computing power $\overline{P}_k = P_k - \mu$. Following the same derivation for Problem P2 results in this section for Optimal Offloading Policy in the Critical Cloud, that is similar to Theorem 2 but of an extra cloud computation constraint.

Due to the computation complexity resulting from iteration, one sub-optimal but simple offloading policy is given in this section for Optimal Offloading Policy in the Critical Cloud. The key idea is to allocate the critical computation resources for UEs firstly according to the offloading priority, and then optimize the time-sharing duration allocation. The performance is shown to be close-to-optimal in the simulation.

Table 4 and 5 discloses optimal method for Problem P3 and sub-optimal method for Problem P3.

TABLE 4

Step 1: Perform one-dimension search for $\mu$.
Step 2: For each $\mu$ in Step 1, obtain the new effective local computing power $\overline{P}_k$. According to Theorem 2, find the optimal $\{\lambda_k^{*(3)}, t_k^{*(3)}\}$.
Step 3: If $\Sigma_{k=1}^{K} C_k \lambda_k^{*(3)} = F_0$, the optimal solution is derived. Otherwise, go to Step 1.

TABLE 5

Step 1: Based on the offloading priority, offload the data from UEs with higher priorities until the cloud computation capacity is fully occupied, i.e., $\Sigma_{k=1}^{K} C_k \lambda_k^{*(3)} = F_0$.
Step 2: With $\{\lambda_k^{*(3)}\}$ derived in Step 1, search for $\lambda$ such that $$t_k^{*(3)} = \frac{\lambda_k^{*(3)} \ln 2}{B\left[W\left(\frac{\lambda h_k^2/\beta_k - N_0}{N_0 e}\right) + 1\right]} \text{ and it satisfies } \sum_{k=1}^{K} t_k^{*(3)} = T_0.$$

Figure 10:
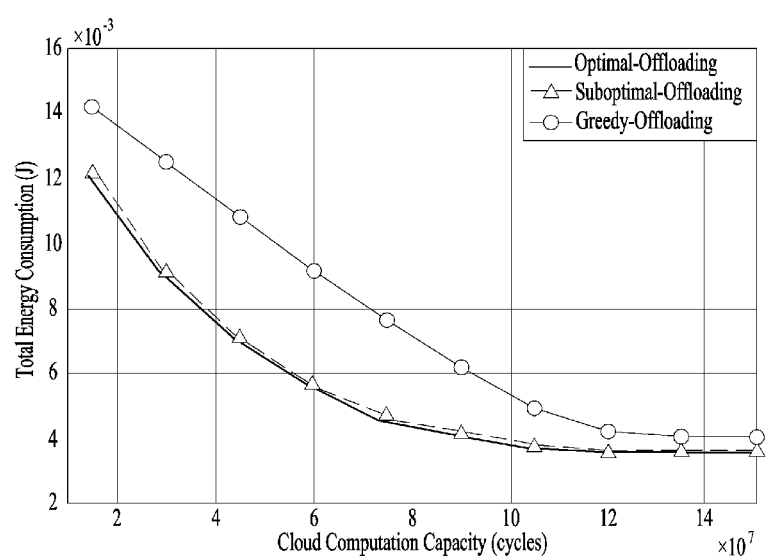
FIGS. 10 and 11 shows the performance of the embodiment.
Figure 11:
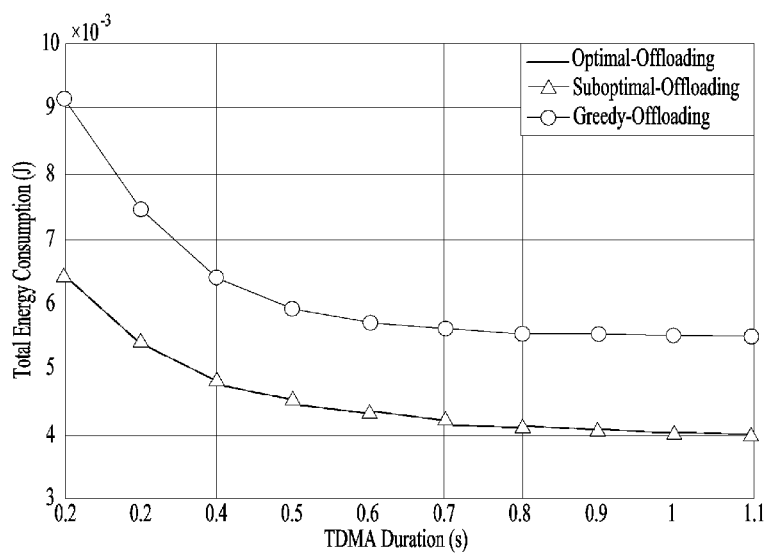

FIGS. 10 and 11 shows the performance of proposed method. The parameters are set as follows unless specific otherwise. The bandwidth and noise power are set as 1 MHz and $10^{-9}$ W, respectively. For this 30-user MCC system, the individual channel gain is Rayleigh distributed and the average power loss is $10^{-6}$. The local computing power is modeled by the Gamma distribution ($\alpha=1$ and $\beta=2$) with the average power set as $5\times10^{-11}$ W/cycle. Moreover, the number of CPU cycles per bit $C_k$ is 1000 cycle/bit, the maximum cloud computing capacity $F_0$ is $9\times10^7$ cycles, and the time-sharing duration $T_0$ is 1 s. Last, the input data $R_k$ is in the uniform distribution and $R_k \in (0,1000)$ bit. Particular, we set the minimum offloaded data as $m_k^+=0.1\times R_k$ for $k \in \{3, 5, 6, 9, 11, 14, 16\}$ and equals to 0 otherwise.

FIG. 10 shows the curve of total energy consumption versus the cloud computation capacity. Compared with the greedy approach that allocates equal offloading duration for all UEs, the optimal policy saves considerable energy with gain up to 50%. Moreover, the suboptimal offloading policy is observed to be close-to-optimal. Last, with the increase of computation capacity, the energy consumption of optimal policy is sharply decreasing at the small computation capacity range, however, low decreasing rate is observed for cloud with the large computation capacity. It indicates that augmenting cloud computation capacity has significant effect on the energy savings for critical cloud, however, does not help a lot for strong cloud since it is not the bottleneck any more.

FIG. 11 displaces the curves of total energy consumption versus the TDMA duration. The greedy approach and optimal offloading policy have almost same trend when the TDMA duration increases. Other observations are similar to those from FIG. 10.

Device Configuration According to Embodiments of the Present Invention

Figure 12:
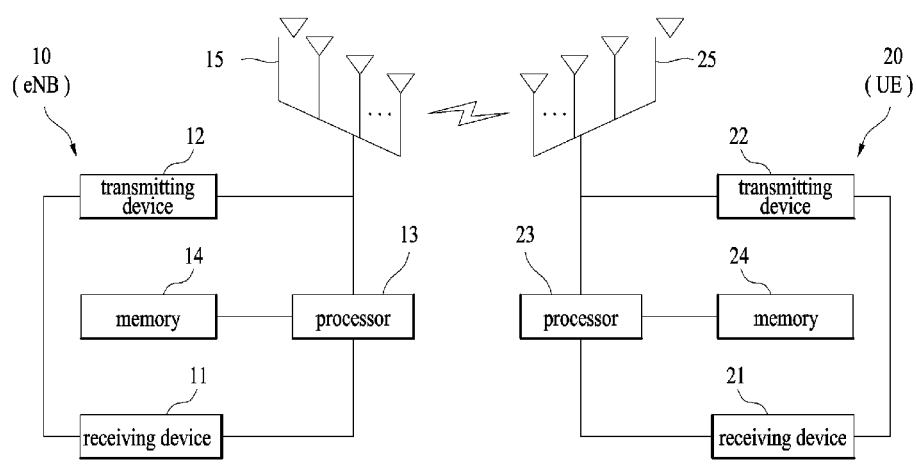
FIG. 12 is a diagram illustrating configurations of a transmission point device and a user equipment device.

FIG. 12 is a diagram illustrating configurations of a transmission point device and a user equipment device according to embodiments of the present invention.

Referring to FIG. 12, a transmission point device 10 according to the present invention may include a receiving device 11, a transmitting device 12, a processor 12, a memory 14 and a plurality of antennas 15. The plurality of the antennas 15 may mean that the transmission point device supports MIMO transmission and reception. The receiving device 11 can receive various signals, data and information in uplink from a user equipment. The transmitting device 12 can transmit various signals, data and information in downlink to the user equipment. And, the processor 12 can control overall operations of the transmission point device 10.

The processor 12 of the transmission point device 10 according to one embodiment of the present invention can handle the details required in each of the embodiments mentioned in the foregoing description.

The processor 12 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 12, a user equipment device 20 according to the present invention may include a receiving device 21, a transmitting device 22, a processor 23, a memory 24 and a plurality of antennas 25. The plurality of the antennas 15 may mean that the transmission point device supports MIMO transmission and reception. The receiving device 21 can receive various signals, data and information in downlink from an eNB. The transmitting device 22 can transmit various signals, data and information in uplink to the eNB. And, the processor 23 can control overall operations of the user equipment device 20.

The processor 23 of the user equipment device 20 according to one embodiment of the present invention can handle the details required in each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The detailed configurations of the transmission point device 10 and the user equipment device 20 can be implemented such that the details explained with reference to various embodiments of the present invention are independently applied or two or more embodiments of the present invention are simultaneously applied. And, redundant description shall be omitted for clarity.

The description of the transmission point device 10 in FIG. 12 may be equally applied to a relay node device as a downlink transmission entity or an uplink reception entity. And, the description of the user equipment device 20 in FIG. 12 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by devices, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

References used in the specification.

<1> S. Sardellitti, G. Scutari, and S. Barbarossa, 'Joint optimization of radio and computational resources for multicell mobile-edge computing,' IEEE Trans. Signal and Info. Processing over Networks, June 2015.

<2> L. Benini, A. Bogliolo, G. Paleologo, and G. De Micheli, 'Policy optimization for dynamic power management,' IEEE Trans. Computer-Aided Design of Integrated Cir. and Sys., vol. 18, no. 6, pp. 813-833, 1999.

<3> X. Chen, 'Decentralized computation offloading game for mobile cloud computing,' IEEE Trans. Parallel and Distributed Systems, vol. 26, no. 4, pp. 974-983, 2015.

<4> P. Pillai and K. G. Shin, 'Real-time dynamic voltage scaling for low-power embedded operating systems,' in Proc. ACM SIGOPS Operating Sys. Review, vol. 35, pp. 89-102, 2001.

<5> B. Prabhakar, E. Uysal Biyikoglu, and A. El Gamal, 'Energy-efficient transmission over a wireless link via lazy packet scheduling,' in Proc. IEEE INFOCOM, vol. 1, pp. 386-394, 2001.

<6> L. Yang, J. Cao, Y. Yuan, A. Han, and A. Chan, 'A framework for partitioning and execution of data stream applications in mobile cloud computing,' ACM SPER, vol. 40, no. 4, pp. 23-32, March 2013.

<7> L. Yang, J. Cao, and Y. Cheng, Hui adn Ji, 'Multi-user computation partitioning for latency sensitive mobile cloud applications,' IEEE Trans. Compers, vol. 64, no. 8, pp. 2253-2266, November 2014.

<8> E Yao, A. Demers, and S. Shenker, 'A scheduling model for reduced CPU energy,' in Proc. IEEE Ann. Symp. Foundations of Computer Science, pp. 374-382, 1995.

<9> K. Kumar, J. Liu, Y.-H. Lu, and B. Bhargava, 'A survey of computation offloading for mobile systems,' Mobile Networks and Applications, vol. 18, no. 1, pp. 129-140, 2013.

<10> X. Wang and G. B. Giannakis, 'Power-efficient resource allocation for time-division multiple access over fading channels,' IEEE Trans. on Info. Theory, vol. 54, no. 3, pp. 1225-1240, 2008.

<11> W. Zhang, Y. Wen, and D. O. Guan, 'Collaborative task execution in mobile cloud computing under a stochastic wireless channel,' IEEE Trans. Wireless Commun., vol. 14, no. 1, pp. 81-93, June 2014.

<12> W. Zhang, Y. Wen, K. Guan, D. Kilper, H. Luo, and D. O. Wu, 'Energy-optimal mobile cloud computing under stochastic wireless channel,' IEEE Trans. Wireless Commun., vol. 12, no. 9, pp. 4569-4581, September 2013.

INDUSTRIAL APPLICABILITY

The above-described embodiments of the present invention can be applied to various kinds of mobile communication systems.

The invention claimed is:

1. A method of indicating an offloading data size and time duration to a user equipment (UE) in a wireless communication system, the method comprising:
receiving, by a Base station (BS) from a plurality of UEs, an input computing data size and local computing power;
determining, by the BS, whether an each priority of the plurality of the UEs is greater than a threshold by using an offloading priority;

determining, by the BS, an offloading data size and a time duration for each of UEs;

transmitting, by the BS to the each of UEs, the determined offloading data size and a time duration for the each of UEs, wherein if offloading priority of a first UE is greater than the threshold, an offloading data size of the first UE corresponds to an input computing data size of the first UE, wherein if offloading priority of a second UE is equal to the threshold, an offloading data size of the second UE is bigger than a delay constraint data size and is smaller than an input computing data size of the second UE, and wherein if offloading priority of a third UE is smaller than the threshold, an offloading data size of the third UE corresponds to a delay constraint data size.

2. The method of claim 1, wherein the offloading priority corresponds to $\varphi(P_k, h_k)$ satisfying $$\varphi(P_k, h_k) = BP_k \log_2\left(\frac{BP_k h_k^2}{N_0 \ln 2}\right) + \frac{N_0}{h_k^2} - \frac{BP_k}{\ln 2},$$

$P_k$ is local computing power for each cycle, $h_k$ is channel gain magnitude, B is bandwidth, $N_0$ is noise power, k indicates k-th UE of the plurality of the UEs.

3. The method of claim 1, wherein a minimum weighted total energy consumption is determined from information including the input computing data size, the local computing power and a channel gain of the plurality of UEs.

4. The method of claim 3, wherein the offloading data size $l_k$ and a time duration $t_k$ are optimized result for the minimum weighted total energy consumption.

5. The method of claim 4, wherein the minimum weighted total energy consumption corresponds to $$\min_{\{l_k, t_k\}} \sum_{k=1}^{K} \beta_k \left[\frac{t_k}{h_k^2} f\left(\frac{l_k}{t_k}\right) + (R_k - \lambda_k) C_k P_k\right]$$

$$\text{s.t.} \sum_{k=1}^{K} t_k \leq T_0, \sum_{k=1}^{K} C_k l_k \leq F_0,$$

$$t_k \geq 0, m_k^+ \leq l_k \leq R_k, k = 1, 2, \ldots, K.$$

wherein function $f(x) = \max\{x, 0\}$, $\beta_k$ is the weighting factor, $t_k$ is the offloading time duration, $l_k$ is offloading data size, $R_k$ is the input computing data size, $C_k$ is the number of CPU cycles, $F_0$ is maximum cloud computation capacity, $T_0$ is a time-sharing constraint, $m_k$ is a delay constraint data size.

6. The method of claim 1, wherein the offloading data size and the time duration determination step is performed when a cloud computation capacity constraint is satisfied.

7. The method of claim 1, wherein the method further comprising, receiving the offloading data from each of UEs having priority that is greater than and equal to the threshold, transmitting the received offloading data to a cloud server, receiving a processed result based on the offloading data from the cloud serve, transmitting the processed result to the each of UEs.

8. A Base station (BS) indicating an offloading data size and time duration to a user equipment (UE) in a wireless communication system, comprising:

a receiving device;

a transmitting device;

and a processor, wherein the processor is configured to receives, from a plurality of UEs, an input computing data size and local computing power, determine whether an each priority of the plurality of the UEs is greater than a threshold by using an offloading priority, determine an offloading data size and a time duration for each of UEs, and transmit by the BS to the each of UEs, the determined offloading data size and a time duration for the each of UEs, wherein if offloading priority of a first UE is greater than the threshold, an offloading data size of the first UE corresponds to an input computing data size of the first UE, wherein if offloading priority of a second UE is equal to the threshold, an offloading data size of the second UE is bigger than a delay constraint data size and is smaller than an input computing data size of the second UE, and wherein if offloading priority of a third UE is smaller than the threshold, an offloading data size of the third UE corresponds to a delay constraint data size.

9. The BS of claim 8, wherein the offloading priority is proportional to a difference between the local computing power and a predetermined power value and the offloading priority is proportional to a difference between a channel gain and a predetermined channel gain.

10. The BS of claim 8, wherein the offloading priority corresponds to $\varphi(P_k, h_k)$ satisfying $$\varphi(P_k, h_k) = BP_k \log_2\left(\frac{BP_k h_k^2}{N_0 \ln 2}\right) + \frac{N_0}{h_k^2} - \frac{BP_k}{\ln 2},$$

$P_k$ is local computing power for each cycle, $h_k$ is channel gain magnitude, B is bandwidth, $N_0$ is noise power, k indicates k-th UE of the plurality of the UEs.

11. The BS of claim 8, wherein a minimum weighted total energy consumption is determined from information including the input computing data size, the local computing power and a channel gain of the plurality of UEs.

12. The BS of claim 11, wherein the offloading data size $l_k$ and a time duration $t_k$ are optimized result for the minimum weighted total energy consumption.

13. The BS of claim 12, wherein the minimum weighted total energy consumption corresponds to $$\min_{\{l_k, t_k\}} \sum_{k=1}^{K} \beta_k \left[\frac{t_k}{h_k^2} f\left(\frac{l_k}{t_k}\right) + (R_k - \lambda_k) C_k P_k\right]$$

$$\text{s.t.} \sum_{k=1}^{K} t_k \leq T_0, \sum_{k=1}^{K} C_k l_k \leq F_0,$$

$$t_k \geq 0, m_k^+ \leq l_k \leq R_k, k = 1, 2, \ldots, K.,$$

wherein function $f(x) = \max\{x, 0\}$, $\beta_k$ is the weighting factor, $t_k$ is the offloading time duration, $l_k$ is offloading data size, $R_k$ is the input computing data size, $C_k$ is the number of CPU cycles, $F_0$ is maximum cloud computation capacity, $T_0$ is a time-sharing constraint, $m_k$ is a delay constraint data size.

* * * * *